May 25, 1965 R. E. LINDEMANN ETAL 3,184,975
DIGITAL MEASURING INSTRUMENT AND DENSIMETER
Filed Oct. 25, 1960 5 Sheets-Sheet 1

INVENTORS
ROBERT E. LINDEMANN
MILTON H. NOVEMBER
BY Berry + Crews
ATTORNEYS

FIG. 3

INVENTORS
ROBERT E. LINDEMANN
MILTON H. NOVEMBER
BY
Berry + Crews
ATTORNEYS

May 25, 1965   R. E. LINDEMANN ETAL   3,184,975
DIGITAL MEASURING INSTRUMENT AND DENSIMETER
Filed Oct. 25, 1960   5 Sheets-Sheet 3

INVENTORS
ROBERT E. LINDEMANN
MILTON H. NOVEMBER
BY
*Berry & Crews*
ATTORNEYS

May 25, 1965 R. E. LINDEMANN ETAL 3,184,975
DIGITAL MEASURING INSTRUMENT AND DENSIMETER
Filed Oct. 25, 1960 5 Sheets-Sheet 4

INVENTORS
ROBERT E. LINDEMANN
MILTON H. NOVEMBER
BY
Berry + Crews
ATTORNEYS

United States Patent Office 3,184,975
Patented May 25, 1965

3,184,975
DIGITAL MEASURING INSTRUMENT AND DENSIMETER
Robert E. Lindemann, Franklin Township, Somerset County, and Milton H. November, Montclair, N.J., assignors to David M. Potter, Far Hills, N.J.
Filed Oct. 25, 1960, Ser. No. 64,876
8 Claims. (Cl. 73—453)

This invention, in one important aspect, relates to instruments of the kind in which a variable angle is scanned, and a digital indication is obtained of either a linear or a non-linear function of the magnitude of the angle.

It is a primary object of the invention to assure that the measure of the significant angle, and no other, will be utilized.

Relatively movable starting and terminal control-pulse initiating members are provided, adapted to generate identical control-pulses as they are passed by the scanner, the former being intended to open a gate for passing signal impulses and the latter to close the gate for cutting off the signal impulses. In order to prevent the unwanted reverse operation, i.e., the opening of the gate by the terminal member control-pulse and the closing of the gate by the starting member control-pulse, provision is made of inhibiting means for normally rendering the gate opening and closing means inaccessible to the control-pulses, but itself rendered non-inhibiting by a control-pulse to make the gate temporarily accessible through a definite, limited angle of travel of the scanner. An arming control-pulse initiating member is additionally provided ahead of the starting member and separated from it by a fixed angle of such small magnitude that the gate opening means will always be accessible to the control-pulse which is initiated by the starting member as the scanner passes the starting member. The movement of the movable control-pulse initiating member is limited to a range such that the terminal member is always spaced from the starting member on the one hand and the arming member on the other, by angles which individually exceed in magnitude the angle through which the inhibiting means is rendered non-inhibiting by a control pulse. In consequence, the gate opening member is always inaccessible for gate opening to the control-pulses originated by the arming and terminal members, but can be made accessible for gate opening to the control-pulses originated by the starting member.

The invention relates further to the measurement of the density or the specific gravity of liquid either for utilization in indicating the actual specific gravity of the liquid or for some other purpose, such as the deriving and indicating of the mass rate of flow of the liquid involved, and/or the total mass of liquid delivered over an extended period.

It is an important object of the invention to provide an improved, submerged, angularly movable, automatic specific gravity sensor having the capability of successive adjustments, the first, herein called a range adjustment, to cause a first arbitrarily chosen specific gravity to correspond to one predetermined angular position of the sensor, and the second, herein called a span adjustment, to cause a second arbitrarily chosen specific gravity to correspond to a second predetermined angular position of the sensor.

The following features, important to the practical and advantageous use of the sensor, characterize the sensor: (a) the change of position of the sensor in operation throughout any chosen range bears a substantially linear relation to the change of specific gravity; (b) the range adjustment, once effected, is not disturbed by the subsequent span adjustment; and (c) the same span adjustment can be chosen, if desired, for different ranges. The importance of the last mentioned characteristic lies in the fact that it enables the sensor to be used in different ranges in combination with a single, unaltered readout or utilization transducer.

Still another important object has to do with the combining of outputs of a volumetric flowmeter, and a submersible, balancing specific gravity sensor, to produce and display a digital measure of the mass flow rate of a liquid stream, and/or the total mass delivered over an extended period.

Other objects and advantages will hereinafter appear.

In the drawing forming part of this specification.

The illustrative instrument is a digital densimeter, being a specific gravity transducer which samples, and determines the specific gravity of, a static or flowing liquid. The output information can be used with proper instrumentation either to measure and indicate specific gravity, or automatically to convert the volumetric output of a volumetric flowmeter to a mass flow measurement and indication in digital form.

The instrument is designed to measure the specific gravity of a liquid under widely variable conditions of pressure and temperature. The range and span of the device can be adjusted to suit a wide variety of liquids. The instrument output is in the form of pulse information, and it is, therefore, referred to as a digital densimeter. Certain features of the sensor are not, however, limited to the digital form of densimeter but are usable also in a densimeter of the analogue type.

A unit 10, adapted to be submerged in a stream of flowing liquid, comprises a sensor or float assembly 12, a follower and pendulum assembly 14 and a scanner assembly 16. The housing for the several assemblies is made in four sections, the main housing 18, a cover 20 for the sensor assembly, a cover 22 for the pendulum and follower assembly, and a cover 24 for the scanner motor and associated parts. The covers 20 and 22 may be readily detached from the main housing 18, and when this is done the remaining parts, other than the scanner and the scanner motor, are found to be mounted upon the main housing in conveniently accessible locations. Fluid pipe and electrical connections are brought into the densimeter unit 10 through the main housing 18, and the pendulum-follower and sensor assemblies are mounted on opposite sides of the main housing and secured in place with snap rings 26 and 27 so that they can readily be gotten to and detached for servicing or replacement.

The sensor comprises a shaft 28 which has an enlarged portion 30. Three arms 32, 34 and 36 (FIG. 7) extend radially outward from the shaft in fixed angular relation to one another. As illustrated, the arms 34 and 36 are at right angles to one another, while the arm 32 makes an angle of 160° with the arm 34, and an angle of 110° with the arm 36. The invention in its broader aspects, however, is not specifically limited to the stated angular relationships.

The arm 32 includes a reduced inner end which extends diametrically through the shaft and which is fixed in place by a set screw, not shown. The arm 32 has fixed upon it a float 38, herein referred to as a buoyancy float, which is desirably made of a material having a low coefficient of thermal expansion, such as glass. The buoyancy float 38 may be secured at a fixed distance from the axis of the shaft 28 by means of a clamping screw 40, a reduced inner end of the screw being threaded radially into the arm 32.

The arm 34 extends diametrically through the shaft portion 30 and is adjustably held in place by a set screw 35. The arm 34 has fast upon it a float 42, hereinafter referred to as the range float, which is substantially smaller than the float 38 but of higher specific gravity than the float 38. The float 42 may be adjusted toward and from the axis of the shaft 28 to change the effective length of the arm 34, by backing off the set screw 35, adjusting the arm radially and retightening the screw.

The arm 36 also extends diametrically through the shaft portion 30 and is adjustably held in place by a set screw 37. The arm 36 has fast upon it a third float 44. The float 44 is also smaller than the float 38 but of higher specific gravity than the float 38. The float 44 may also be adjusted toward and from the axis of the shaft 28 by backing off of the set screw 37, adjusting the arm 36 radially, and retightening the screw. The floats 42 and 44 and the arms 32, 34 and 36 are composed of material having a very low coefficient of thermal expansion but having a substantially higher specific gravity than the float 38, being desirably composed of invar.

The principle of operation of the sensor assembly and the purpose and principle of the adjustments provided will be pointed out in detail after the description of the structure of the unit 10 has been completed. It may be noted, however, that the sensor unit, including the shaft 28, is adapted to rock about the axis of the shaft. When the float chamber is filled with liquid within the specific gravity range for which the sensor is designed, the sensor will assume an angular position characteristic of the density of the liquid in which it is submerged. It may be noted in passing that although the members 38, 42 and 44 are referred to as floats, they are of solid construction, and have specific gravities considerably in excess of the specific gravity of any liquid with which they would be used.

The shaft 28 is supported in suitable bearings 46 and 48 which are carried in a bearing sleeve 50. The bearing sleeve 50 has integral with it, a disc 52, which disc is secured in fixed relation to the main housing member 18 by means of the snap ring 26.

The main housing member 18 is formed with an inlet passage 45 and two rectangularly related outlet passages 47 and 49. A baffle sleeve 51 is formed with openings in alignment with the outlet passages 47 and 49, but agitation of the liquid within the sensor chamber is prevented by causing the sleeve 51 to extend unbrokenly across the inlet passage 45 for preventing direct ingress of the liquid. The cover 20 is internally cylindrical in form and the sleeve 51 extends substantially the full length of the chamber, terminating adjacent to the end wall of the chamber which is remote from the inlet passage 45 and from the outlet passages 47 and 49. In order to enter the chamber, the liquid is required to flow through a very thin annular space which surrounds the sleeve 51 to the extreme forward end of the sleeve, thence substantially impartially around all portions of the sleeve end, and finally rearwardly to the ports through which the sleeve communicates with the passages 47 and 49. Through suitable pipes, not shown, a continuous circulation of liquid through the chamber is maintained.

Figure 3:
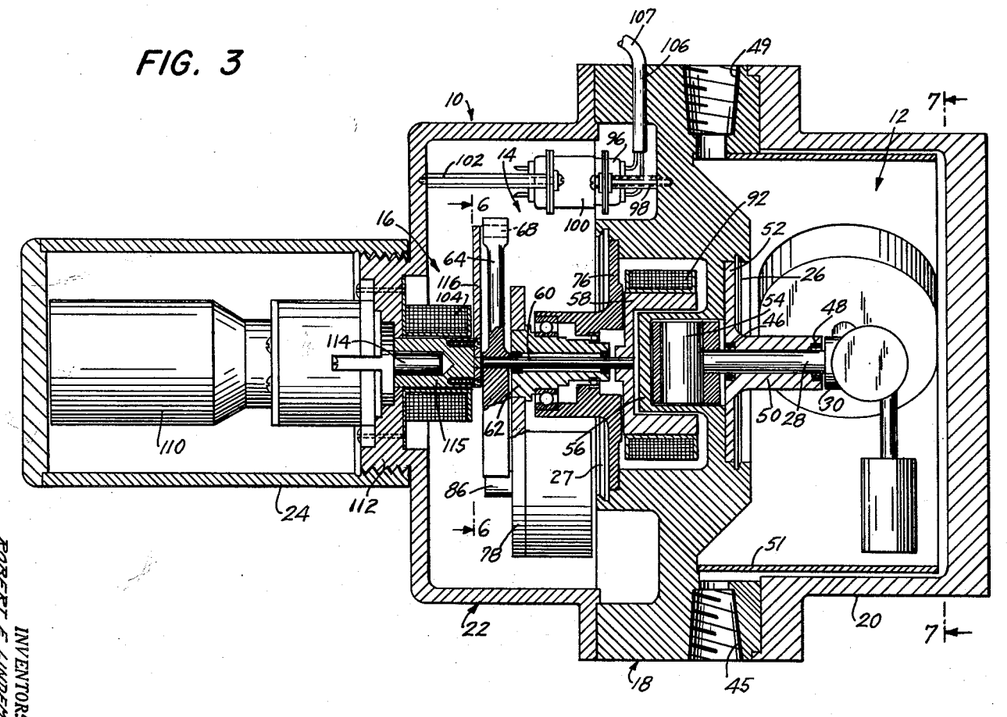
FIG. 3 is a view in sectional elevation of the complete sensor and scanner assembly.
Figure 4:
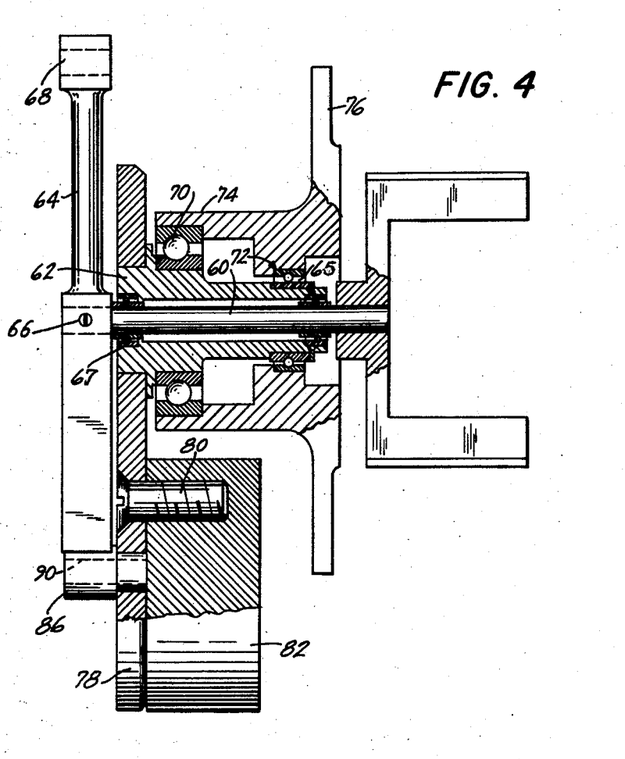
FIG. 4 is a detail view in side elevation, partly broken away, showing a sensor follower and pendulum assembly.
Figure 5:
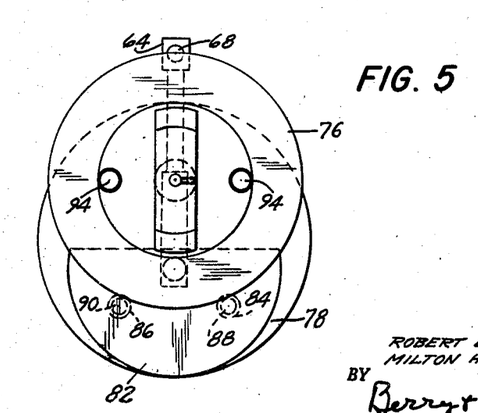
FIG. 5 is a view of the structure of FIG. 4 as seen from the right thereof.
Figure 6:
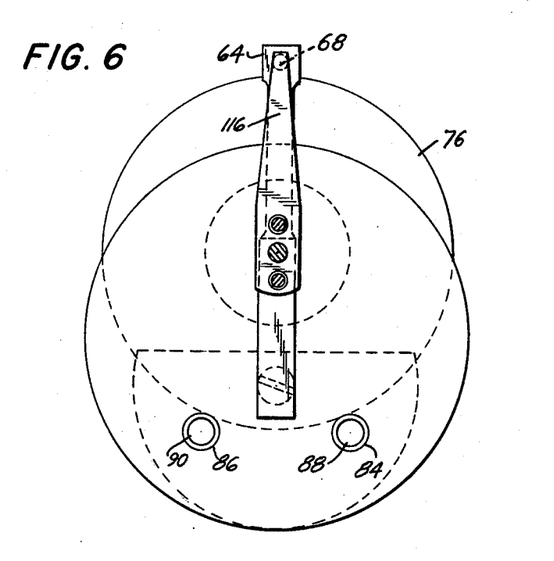
FIG. 6 is a sectional view taken upon the line 6—6 of FIG. 3 looking in the direction of the arrows.

The sensor is connected inductively to the follower, (FIGS. 3, 4, 5 and 6 but particularly FIGS. 3 and 4) and the follower is arranged to be brought into a position corresponding to that of the sensor through means which has a minimum tendency to interfere with the free and accurate positioning of the sensor, in accordance with the principle disclosed in Letters Patent of the United States No. 2,891,403 granted to David M. Potter on June 23, 1959 for Specific Gravity Meter. The present invention, however, involves some significant features of improvement over the disclosure of the patent. The shaft 28 carries at its rear end a bar magnet 54 which is contained within a hollow boss 56 of the main housing member 18. A yoke 58 of permeable material has its arms disposed at opposite sides of the boss 56, and extended completely across the ends of the magnet poles. The diametrical arrangement of the bar magnet and the extension of the yoke arms far enough to completely cover the poles avoids all tendency to shift the sensor axially, and therefore avoids the development of thrust friction in the sensor. The yoke 58 is carried at one end of a shaft 60, being free to turn with the shaft and to have its arm aligned with the opposite poles of the magnet 54. The poles of the magnet 54 tend to draw the arms of the yoke 58 into alignment with themselves, but the friction and inertia of the follower tend to interfere with the securement of the aligned condition.

The follower shaft 60 extends through a hollow pendulum shaft 62, being supported through ball bearings 65 and 67 from the latter shaft. The shaft 60 has a balanced bar 64 adjustably fixed on its rear end by means of a set screw 66 FIG. 4. The bar 64 carries at one end a terminal or measuring magnet 68, the purpose of which will be explained later.

The pendulum shaft 62 is supported through ball bearings 70 and 72 from a stationary bearing sleeve 74. The bearing sleeve 74 has integral with it a disc 76, which disc is securely clamped in fixed relation to the main housing member 18 by means of the split ring 27. The shaft 62 has fixed upon its rear end a pendulum arm 78 which, through a headed clamping screw 80, supports a noncircular weight 82. The screw 80 passes freely through the arm 78 but is threaded into the weight 82 so that it may clamp the weight 82 firmly to the arm. By backing off the screw slightly, the weight 82 is freed for angular adjustment and may be secured in a desired new position of adjustment by retightening the screw. The center of mass of the pendulum will always be located directly below the axis of the shaft 60, and hence a desired angular position of the arm 78 with respect to the vertical will always be maintained. The pendulum weight 82 has mounted upon it a pair of studs 84 and 86 in which small permanent bar magnets 88 and 90 are contained. The purpose of the magnets will be explained at a subsequent point.

The yoke 58 is surrounded by a coil 92, which coil is energized by alternating current, say 60 cycle current, to create bursts of flux for assisting in bringing the follower into angular correspondence with the sensor without disturbing the sensor in the position freely assumed by it, the principle being the same as that disclosed in Patent No. 2,891,403.

Stops 94, affixed to the housing member 18 at diametrically opposite points, stand in obstructing relation to the arms of the yoke 58, limiting the angle through which the yoke may turn and thereby preventing accidental turning over of the follower to a position 180° out of phase with the intended condition. This limitation of movement is particularly important when the sensor is used in an analogue instrument in which the follower carries the movable member of a potentiometer. The stops can be removed when the sensor is used in a digital instrument as illustratively shown herein.

An electrical socket 96 is supported from the casing member 18 through a bracket 98, and a complementary plug member 100 is supported from the cover member 22 through a bracket 102. All the necessary wires for connecting the coil 92 and a coil 104, to be described, to other apparatus located outside the unit 10, are housed in a conduit 107 which is brought in through a passage 106, formed in the casing member 18, and are connected to appropriate terminals of the socket 96. The necessary power wires for a motor 110 may also be housed in the conduit, brought in through the passage 106, and connected to the socket 96. The electrical connections are completed through the plug 100. When the cover member 22 is removed from the casing member 18, the plug 100 is disconnected from the socket 96, but when the cover member is put back in place, the plug prongs are at the same time reinserted in the socket and the electrical circuits are reestablished.

A motor 110 is attached to a threaded boss 112 of the cover member 22, being carried by the cover member 22. The motor shaft 114 drives continuously, and at constant speed, the hub 115 of a permeable, conductive scanner arm 116. The arm 116 is driven in a clockwise direction as viewed in FIG. 6, always traversing the arming magnet 88, the starting magnet 90 and the terminal magnet 68 in the order named. Each magnet constitutes a control-pulse initiating member, the scanning arm 116 being adapted inductively to initiate or generate a control-pulse in the coil 104, which surrounds the hub 115, as it passes each of the magnets referred to.

Figure 1:
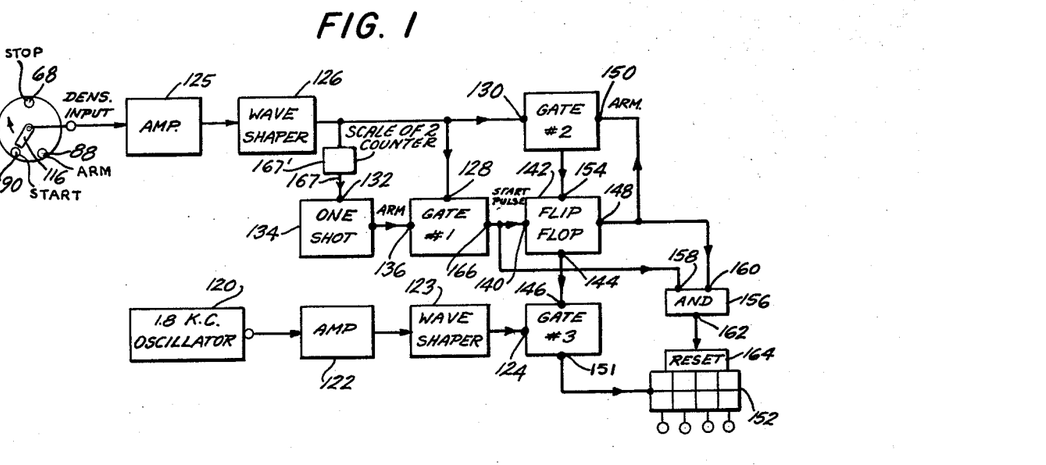
FIG. 1 is a block diagram of an electronic gating and counting transducer which embodies important features of the invention.
Figure 9:
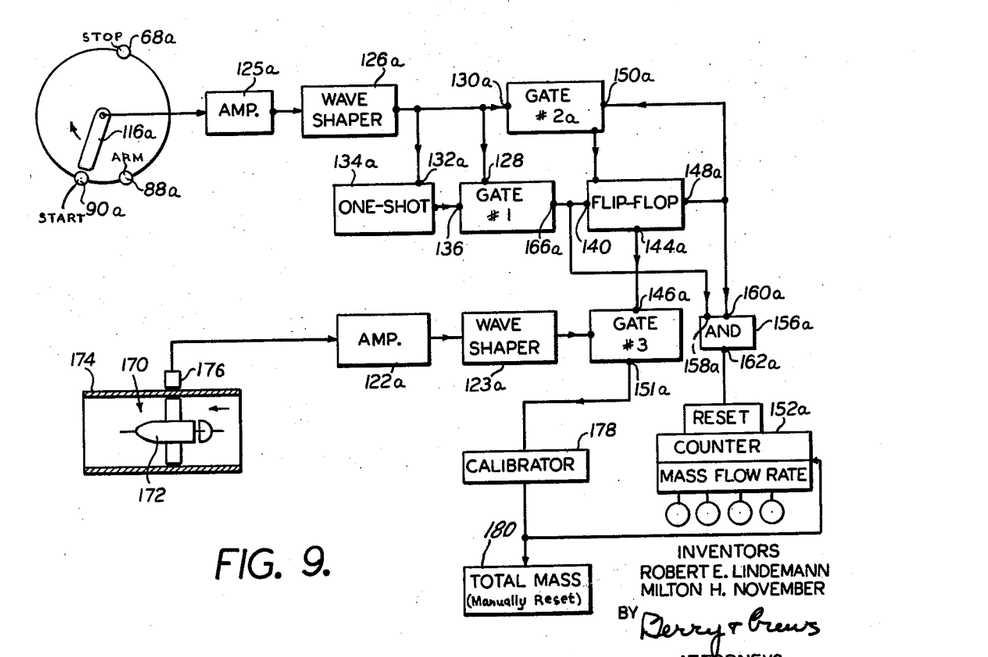
FIG. 9 is a diagrammatic view showing the combining of the specific gravity sensor output and a volumetric flowmeter output to produce a digital measure of the mass flow rate, and a digital indication of the total mass of liquid delivered over an extended period.

The control pulses are utilized in the control of electronic apparatus like that diagrammatically shown in FIG. 1 or like that diagrammatically shown in FIG. 9. Before proceeding with a description of the apparatus of FIG. 1, the general purpose of that apparatus will be indicated and then the principle of adjustment and of operation of the unit 10 will be explained more fully.

By an appropriate selection of constants in the sensor, the sensor can be caused to vary its position almost linearly with change of specific gravity of the liquid in which the sensor is submerged over a substantial but limited angle, of the order of forty degrees. In the illustrative instrument it may be assumed that the forty degree range is intended to cover substantially linearly a minimum specific gravity of .680 and a maximum specific gravity of .880. In other words, through a range of forty degrees a span of .200 specific gravity can be covered substantially linearly. If the beginning of the forty degree range were marked .680 and the end were marked .880, then on the same scale the zero specific gravity point would be measured backward 136° from the magnet 68 to determine a proper location of the starting magnet 90. All angular values between 136° and 176° would then be substantially proportional to the specific gravity of the liquid.

The angular separation of 176° between the magnet 68 and the magnet 90 when the specific gravity is .880, can be obtained by adjusting the bar 64 angularly about the shaft 60. Minor adjustments can be effected by adjusting the pendulum weight 82 about the axis of the screw 80. In order for the substantially linear relationship to be established, however, certain physical relationships between the floats 38, 42 and 44 must first be established and maintained. The angular relationship of the three floats is fixed and unchangeable, but the effective arms of the floats 42 and 44 can be adjusted, and they require to be adjusted in order to cause a definite forty degrees of travel to cover precisely the range from .680 to .880.

In order to effect this kind of adjustment, the sensor is first submerged in a liquid known to have a specific gravity of .880. The range float 42 is then adjusted toward or from the axis of the shaft 28 to vary the angular disposition of the sensor until the span float 44 has been caused to occupy a vertical position. Under these conditions the range arm 34 extends horizontally to the left, while the buoyancy arm 32 extends to the right at an upward inclination of twenty degrees. Since, in this position of the sensor, the arm 36 hangs vertically, the float 44 exerts no turning moment, and it can be adjusted toward and from the axis of the shaft 28 without affecting the balanced condition of the sensor. If the liquid of specific gravity .880 is now replaced by a liquid of specific gravity .680, the sensor will swing in a clockwise direction through a substantial angle, say to the order of forty degrees. The span float can now be adjusted toward or from the axis of the shaft 28 until the change from the first position of adjustment is precisely forty degrees. In this latter position the buoyancy arm 32 will extend toward the right at a downward inclination of twenty degrees, the span arm 36 will extend toward the left at a downward inclination of fifty degrees and the range arm 34 will extend toward the left at an upward inclination of forty degrees.

Figure 7:
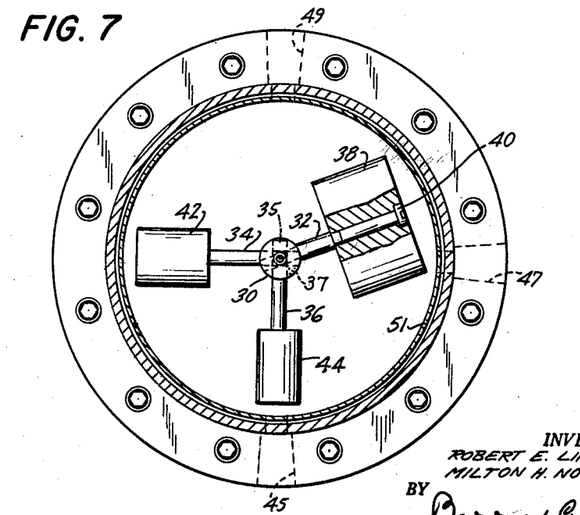
FIG. 7 is a sectional view taken upon the line 7—7 of FIG. 3 looking in the direction of the arrows.

If we designate as A the fixed angle of twenty degrees by which the arm 32 is disaligned from the arm 34, and as X the variable angle through which the sensor is moved clockwise from the position of FIG. 7, then the following equation obviously expresses the law of operation of the sensor.

$$(W_1R_1 - SV_1R_1) \cos (A-X) = (W_2R_2 - SV_2R_2) \cos X + (W_3R_3 - SV_3R_3) \sin X \quad (1)$$

From equation 1 the following expression for specific gravity can be readily derived $$S = \frac{W_1R_1 \cos A - W_2R_2 + (W_1R_1 \sin A - W_3R_3) \tan X}{V_1R_1 \cos A - V_2R_2 + (V_1R_1 \sin A - V_3R_3) \tan X} \quad (2)$$

In the above equations, $W_1$, $W_2$ and $W_3$ are the weights respectively of floats 38, 42 and 44; $R_1$, $R_2$ and $R_3$ are the distances, respectively, from the axis of the shaft 28 to the centers of gravity of the arm and float combinations involving the floats 38, 42 and 44 respectively, $V_1$, $V_2$ and $V_3$ are the respective volumes of the floats 38, 42 and 44 and S is the specific gravity of the liquid in which the sensor is submerged. The angular values involved have been explained above.

Equation 2 may be simplified to read:

$$S = \frac{K_1 + K_2 \tan X}{K_3 + K_4 \tan X} \quad (3)$$

where $K_1$, $K_2$, $K_3$ and $K_4$ are constants equal, respectively, to $(W_1R_1 \cos A - W_2R_2)$, $(W_1R_1 \sin A - W_3R_3)$, $(V_1R_1 \cos A - V_2R_2)$ and $(V_1R_1 \sin A - V_3R_3)$.

For the securement of substantial linearity the following relationships should prevail: $K_1 = .880K_3$; $K_2 = .0091K_3$; and $K_4 = .3639K_3$.

These relationships have been obtained in the illustrative mechanism by employing the following specific values:

| | | |
|---|---|---|
| $W_1 = 85.9064$ gm. | $R_1 = 3.0574$ cm. | $V_1 = 39.4066$ cm.³ |
| $W_2 = 54.0880$ gm. | $R_2 = 3.2537$ cm. | $V_2 = 6.7610$ cm.³ |
| $W_3 = 30.1216$ gm. | $R_3 = 3.1439$ cm. | $V_3 = 2.5490$ cm.³ |

The illustrative mechanism as shown and described is not limited to a specific gravity range of .680 to .880, nor is it limited to the assigning of exactly forty degrees to a specific gravity span of .200. So long as the sensor unit is designed for use with the illustrative mechanism of FIG. 1, however, forty degrees must be assigned to a specific gravity span of .200. Even with this limitation, however, to the requirements of a specific angle interpreting transducer, a specific gravity range as low as .480 to .680 and up to as high as 1.030 to 1.230 may be covered by the same forty degree range of movement of the sensor.

Figure 2:
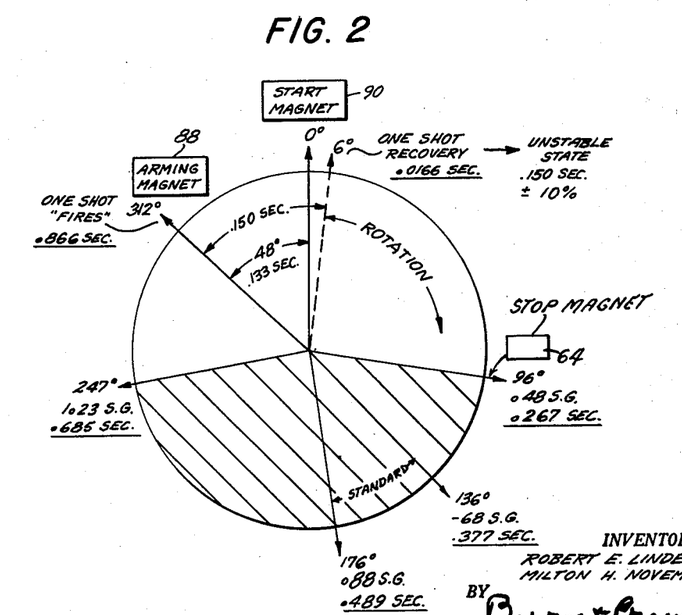
FIG. 2 is a diagrammatic view illustrative of the events which occur, or which may occur, in a single revolution of the scanner.

For a complete understanding of the scanning transducer reference may be had to FIGS. 1 and 2. In FIG. 2 the arming and starting magnets 88 and 90 are illustrated, not in their actual physical positions, but in their fixed angular relationship to one another. It will be noted that the direction of rotation of the scanner arm 116 is clockwise as viewed in FIGURE 2, that the starting magnet 90 is shown in a datum or zero angle position at top center of the diagram, and that the arming magnet 88 is located ahead of the starting magnet by a fixed angular amount, namely, forty-eight degrees.

If it be assumed that the instrument is being prepared to cover, in a forty degree span, a specific gravity range from .680 to .880, the sensor is first submerged in liquid known to have a specific gravity of .880, and the range arm 34 is then adjusted to cause the sensor to be balanced in the liquid with the span arm 36 in a vertically depending position as illustrated in FIGURE 7. The arm 64 which carries the terminal magnet 68 is then adjusted relative to the shaft 60 to locate the magnet 68 a space of 176° away from the starting magnet 90 in a clockwise direction. If preferred, the final part of the relative adjustment of the starting and terminal magnets can be effected by adjustment of the pendulum weight 82 about the axis of the screw 80. Neither manner of adjustment disturbs the final relative spacing of the magnets 88 and 90.

The further calibration of the instrument is carried out in the manner already described, the result being that the instrument is adapted accurately to measure the specific gravity of liquids in the range from .680 to .880 over the forty degree arc marked "standard" in FIGURE 2. As has been noted, the active arc of forty degrees could have been made to cover any desired range of .200 specific gravity span between a minimum of .480 and a maximum of 1.235, through suitable adjustment of the range and span arms and appropriate adjustment of arm 64 relative to the shaft 60, and in each instance a specific gravity increment of .005 would uniformly correspond to an angular increment of one degree of the sensor.

The motor 110 drives the scanner arm continuously in a clockwise direction (as viewed in FIGS. 1 and 2, from the rear of the unit) at a constant rotary velocity of one revolution per second. The scanner arm 116 causes indistinguishable control-pulses to be induced in the coil 104 each time that the arm passes any one of the magnets 88, 90 and 68. It is important that the angle beginning with the starting magnet 90 and ending with the terminal magnet 68 be measured, but that the angle beginning at the terminal magnet 68 and ending at the starting magnet 90 be excluded from measurement. A salient feature of the invention has to do with means for achieving this result.

As seen in FIG. 1, signal impulses from an oscillator 120 of constant frequency (illustratively 1.8 kc.) are transmitted through an amplifier 122 and a wave-shaper 123 to a terminal 124 of a gate 3. The gate 3 is normally closed, but provision is made for opening the gate in response to the control-pulses originated by the starting magnet 90 and for reclosing the gate in response to the control pulses originated by the terminal magnet 68.

The identical control pulses originated by the magnets 88, 90 and 68 are impartially transmitted through an amplifier 125 and a wave-shaper 126. From the wave-shaper 126 the pulses can reach terminals 128 and 130 of normally closed gates 1 and 2, respectively, and an input terminal 132 of a monostable multivibrator or one-shot 134.

When a first pulse comes through, it can have no effect upon the closed gates 1 and 2, but it does affect the one-shot 134 for approximately .150 second, or for fifty-four degrees of travel of the scanner arm 116. During this period the one-shot 134 acts through terminal 136 of the gate 1 to hold the gate open, and if a following pulse comes through in that time it can enter the gate through terminal 128 and pass through the gate. At the end of the fifty-four degree arc, however, the one-shot and the gate 1 automatically return to their original conditions.

Since the arming magnet 88 is located only forty-eight degrees ahead of the starting magnet 90, the one-shot 134 will always be active and the gate 1 will always be held open at the time when the pulse originated by the starting magnet 90 comes through. No pulse originated by the terminal magnet 68, or by the arming magnet 88 can ever pass through the gate 1 because the terminal magnet 68 is always located substantially more than fifty-four degrees after the starting magnet and the arming magnet 88 is always located substantially more than fifty-four degrees after the terminal magnet. The temporary influence of the pulses from the starting magnet 90 and the terminal magnet 68 upon the one-shot 134 is, therefore, a nullity.

When a control-pulse originated by the starting magnet 90 is passed by the gate 1, it reaches the terminal 140 of a bistable multivibrator or flip-flop 142. The control-pulse triggers the flip-flop 142, causing a gate opening current to be transmitted through terminal 144 of the flip-flop 142 to terminal 146 of gate 3, and a gate opening current to be transmitted from terminal 148 of flip-flop 142 to terminal 150 of gate 2.

The opening of gate 3 permits the signal impulses originated by the oscillator 120 to flow from input terminal 124 of gate 3, through output terminal 151 thereof, to a digital counter and indicator 152. So long as the flip-flop 142 is not triggered at terminal 154, it will continue to hold the gates 2 and 3 open.

When the control pulse from the terminal magnet 68 comes through, however, it will pass the now open gate 2 and will trigger the flip-flop 142 at terminal 154. The consequence of this will be a return of the flip-flop 142 to its original stable state in which it has no output to the gates 2 and 3, and a resultant closing of the gates 2 and 3. The counting period, therefore, runs from the instant that the scanner arm 116 passes the starting magnet 90 to the instant when the scanner arm passes the terminal magnet 68. Since five signal impulses from the 1.8 kc. oscillator 120 will pass the gate and be counted for each degree of travel of the scanner arm 116, and since a one degree change of position of the sensor corresponds to a specific gravity increment of .005, it is evident that each pulse counted will correspond to a specific gravity increment of .001, and when so counted, will cause the correct specific gravity of the liquid to be digitally indicated.

Figure 8:
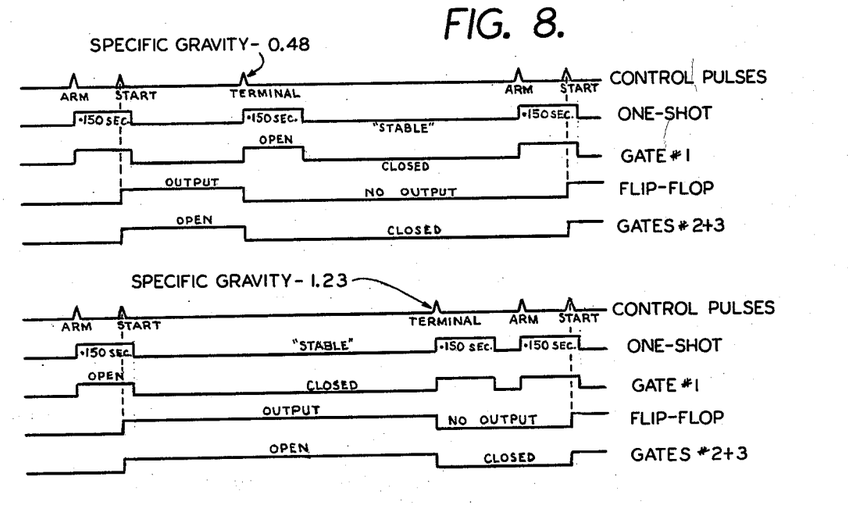
FIG. 8 is a chart illustrative of the sequence of events occurring in a scanning cycle.

The sequence of events may also be traced with the aid of the diagrams of FIG. 8, which show the conditions of the various electronic devices involved as the several events occur which are brought about by the movement of the scanner past the arming, starting and terminal magnets 88, 90 and 68.

When the count for one revolution of the arm 116 is complete, the total continues to be exhibited by the device 152 until the start of the next counting cycle; i.e., until the arrival of the next control pulse which is initiated by the starting magnet 90. At that instant the device 152 is instantaneously, automatically reset to zero and a new count begins.

The resetting is controlled through an AND device 156 which requires the concurrent application of control pulses at two of its terminals, 158 and 160, in order to cause a single resetting control pulse to be transmitted from its terminal 162 to an automatic, monostable resetting device 164. The terminal 166 of the gate 1 is connected to the terminal 158 of the AND device 156 while the terminal 148 of the flip-flop 142 is connected to the terminal 160 of said device. With the arrival of the control pulse initiated by the starting magnet 90 (the only pulse which is ever passed by the gate 1), suitable voltages are applied to both 158 and 160, and the resetting is instantaneously achieved. Since the control pulse originated by the starting magnet 90 is extremely transitory, the device 152, after instantaneous resetting, is free to pick up the new count.

It may be considered desirable to cause the final count to be exhibited for more than a mere fraction of a second, in which case a single stage, scale-of-two counter 167′ may be interposed just ahead of one-shot 134. With this arrangement, a single control-pulse is caused to reach the one-shot 134 for each even numbered control pulse.

If, starting with an arming pulse, all the pulses initiated by the magnets 88, 90 and 68 were consecutively numbered, the arming pulses would be 1, 4, 7, 10, 13 etc. The odd numbered arming pulses would not reach the one-shot 134, but the even numbered arming pulses 4, 10, 16, etc. would. Starting pulses 5, 11, 17, etc. would reset the counter and initiate a new count, and terminal pulses, 6, 12 and 18 etc. would terminate the counts. Pulses 1, 2, 3, 7, 8, 9, 13, 14, 15, etc. would be without significant effect. When a count has been run up during one revolution of the arm 116, it will be maintained and exhibited for the remainder of the current revolution and through all of the immediately following revolution.

It has been mentioned that the instrument may be modified to exhibit digitally the rate of mass flow of the liquid involved and the total mass of liquid delivered over any desired period. Such a modification is illustratively disclosed in FIG. 9.

FIG. 9 is identical with FIG. 1 in every way, save that a signal-impulse-generating flowmeter sensor 170 has been substituted for the constant frequency oscillator 120 of FIG. 1, and a calibrator and a totalizing counter have been added. Corresponding reference characters with the subscript $a$ added in each instance have accordingly been applied to corresponding parts in FIG. 9 and the description will be confined to the features of difference. A terminal magnet 68$a$ is controlled in its position, as before, from the specific gravity sensor of FIGS. 3 to 7.

The flowmeter sensor 170 may be of the Potter type. It comprises a vaned rotor 172 which is coaxially disposed in conduit 174 of known cross-section. The rate of rotation of rotor 172 is proportional to the rate of volumetric flow of the liquid. The rotor is arranged to induce signal impulses at uniform angular intervals in a coil 176, the frequency of the signal impulses being always proportional to the rate of volumetric flow of the liquid. With this kind of arrangement, the angular travel of the scanner, while the gate 3$a$ is open, is proportional to the specific gravity of the liquid, and the number of signal impulses generated per revolution of the scanner (illustratively in one second) is proportional to the volumetric flow rate. The number of impulses passed by the gate in one second is proportional to the product of volumetric flow rate by specific gravity and is, threfore, proportional to the mass flow rate. By appropriate setting of a calibrator 178, the device 152$a$ can be caused during each second to run up and exhibit a count which is equal to the number of pounds of liquid delivered per second.

The total quantity delivered over an extended operating period can be digitally determined and exhibited in a totalizing counter 180, simply by feeding into the counter all the signal impulses put out by the calibrator 178 during such extended period. The counter 180 can be manually reset to zero at any time desired.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

We claim:

1. A digital densimeter comprising, in combination, a rockably mounted, submersible, balancing sensor whose angular position changes substantially linearly with change of the specific gravity of the liquid in which the sensor is submerged, relatively fixed and movable pulse initiating members variably spaced from one another by an angle which is a measure of the specific gravity of the liquid, the movable member being controlled in its position by the sensor, one of said initiating members being a starting member, and the other member being a terminal or measuring member, an arming pulse initiating member located just ahead of the starting member in fixed relation thereto, a uniformly rotating scanner for traversing the arming member, the starting member and the terminal member in the order named during each revolution and causing the several pulses to be initiated successively as it passes the respective members, means for generating impulses of uniform frequency, gating means opened by the pulse from the starting member and closed by the pulse from the terminal member for passing a number of impulses per cycle which is proportional to the specific gravity of the liquid, means responsive to the passed impulses for producing and exhibiting a digital measure of the specific gravity of the liquid, and an arming device normally inhibiting opening of the gating means but responsive to any one of said pulses to remove the inhibition for a limited travel of the scanner, greater than the separation of the arming member from the starting member, but less than the separation of the terminal member from either the starting member or the arming member, so that the starting member only may open the gating means.

2. A device for digitally untilizing a chosen variable angle and no other between two relatively movable reference points comprising, in combination, a pair of control-pulse initiating members located at, and determining, the respective points, the first of said initiating members being a starting member fixed in a zero or starting position, and the second member being an angularly movable terminal member, a rotatively mounted support for the terminal member, an arming control-pulse initiating member located ahead of the first member, a continuously and uniformly rotating scanner for traversing the arming member, the starting member and the terminal member in the order named in each revolution, means for generating signal impulses to be counted, a gate for controlling transmission of said signal impulses, a gate operating device, inhibiting means normally maintaining said device inaccessible to the control-pulses but being temporarily rendered non-inhibiting by a control-pulse from any one of said control-pulse initiating members to render the gate operating device accessible to, and operable by, a following control-pulse through only a limited, predetermined angle of travel of the scanner, the arming member being located ahead of the starting member by a fixed angle which is less than said predetermined angle of travel of the scanner, so that the inhibiting means is maintained in a non-inhibiting condition at the time when the scanner passes the starting member and the control-pulse from the starting member is therefore able to cause the gate to be set in an open condition for the transmission of the signal impulses, the terminal pulse initiating member being limited in its movement to a range which is spaced from the starting member on the one hand and the arming member on the other by angles which individually exceed in magnitude the angle through which the inhibiting means is rendered non-inhibiting by a control-pulse, thereby to prevent initiation of a signal impulse transmitting period by either the terminal pulse initiating member or the arming pulse initiating member.

3. The device according to claim 2 including a further control-impulse inhibiting means through which a control-pulse must pass in order to cause the gate operating device to close the gate, said further inhibiting means being normally effective, but being rendered and maintained non-inhibiting by the gate operating device from the opening of the gate in response to the control-pulse from the starting member, so that the control pulse from the terminal member alone may cause closing of the gate, and being restored to an inhibiting condition by the gate operating device concurrently with the closing of the gate.

4. The device according to claim 2 including means enabling the terminal control-pulse only to close the gate mechanism for counting the signal impulses passed by the gate in each revolution of the scanner and digitally exhibiting the result of the count until a new count is to be started, and means for clearing the counting and exhibiting mechanism concurrently with the next closing of the gate.

5. In a densimeter, a submersible balancing sensor comprising, in combination,
   a shaft,
   means supporting the shaft for movement about a substantially horizontal axis,
   a series of radially extending arms on the shaft including
   a buoyancy float arm,
   a range float arm and
   a span float arm,
   a comparatively large, comparatively low specific gravity buoyancy float supported on the buoyancy float arm, and
   comparatively small, comparatively high specific gravity range and span floats mounted, respectively, on the range and span float arms, each with capacity for adjustment toward and away from the shaft axis, the several arms being fixed angularly in relation to one another and to the shaft, with the range and span arms disposed at right angles to one another and with the range and buoyancy arms disaligned by a small but substantial angle less than 90° whereby when said shaft moves within the range of said angle last mentioned in response to variation in density of the liquid, such angular movement is substantially constantly proportional to said variation and the angular position of said shaft is a measure of the density sought.

6. The densimeter according to claim 5 in which said small, but substantial angle by which the buoyancy arms is disaligned with the range arm is on the order of 20°.

7. A digital density responsive apparatus comprising in combination,
   a rockably mounted, submersible balancing sensor whose angular position changes substantially linearly with change of the density of the liquid in which the sensor is submerged,
   relatively fixed and movable pulse initiating members variably spaced from one another by an angle which is a measure of the density of the liquid, the movable member being controlled in its position by the sensor, one of said initiating members being a starting member, and the other member being a terminal or measuring member,
   an arming pulse initiating member located just ahead of the starting member in fixed relation thereto,
   a uniformly rotating scanner for traversing the arming member, the starting member and the terminal member in the order named during each revolution and causing a pulse to be initiated successively as it passes each respective member,
   means for generating counter actuating impulses, gating means opened by the pulse from the starting member, and closed by the pulse from the terminal member for passing said counting impulses,
   counter means responsive to said impulses passed thereto for producing and exhibiting a digital measure of same, and
   an arming device normally inhibiting opening of the gating means, but responsive to any one of said pulses to remove the inhibition for limited travel of the scanner greater than the separation of the arming member from the starting member, but less than the separation of the terminal member from either the starting member or the arming member, so that the starting member only may open the gating means.

8. The apparatus according to claim 7 in which said means for generating counter actuating impulses are constituted by a volumetric liquid flowmeter sensor furnishing impulses whose frequency is proportional to the volumetric flow rate, whereby said counter is caused to display a measure of the mass flow rate.

References Cited by the Examiner
UNITED STATES PATENTS

| | | | |
|---|---|---|---|
| 2,680,241 | 6/54 | Gridley | 340—206 |
| 2,730,698 | 1/56 | Daniels et al. | 340—206 |
| 2,734,188 | 2/56 | Jacobs | 340—206 |
| 2,770,798 | 11/56 | Roth | 340—206 |
| 2,831,348 | 4/58 | Kritz | 73—194 |
| 2,891,403 | 6/59 | Potter | 73—453 |
| 2,934,825 | 5/60 | Braybrook et al. | 340—206 |
| 2,943,487 | 7/60 | Potter | 73—231 |
| 2,974,525 | 3/61 | Cole | 73—32 |

RICHARD C. QUEISSER, *Primary Examiner.*

ROBERT L. EVANS, JOSEPH P. STRIZAK, *Examiners.*